United States Patent [19]

Yunick

[11] Patent Number: 4,637,365
[45] Date of Patent: Jan. 20, 1987

[54] FUEL CONDITIONING APPARATUS AND METHOD

[75] Inventor: Henry Yunick, Daytona Beach, Fla.

[73] Assignee: MotorTech, Inc., Daytona Beach, Fla.

[21] Appl. No.: 663,552

[22] Filed: Oct. 22, 1984

Related U.S. Application Data

[63] Continuation-in-part of Ser. No. 622,409, Jun. 22, 1984, Pat. No. 4,503,833, which is a continuation of Ser. No. 312,495, Oct. 19, 1981, abandoned, which is a continuation-in-part of Ser. No. 247,066, Mar. 24, 1981, abandoned.

[51] Int. Cl.⁴ ............................................. F02M 31/00
[52] U.S. Cl. ..................... 123/545; 123/547; 123/548
[58] Field of Search ............... 123/545, 546, 547, 548; 165/52; 261/144, 145

[56] References Cited

U.S. PATENT DOCUMENTS

| | | | |
|---|---|---|---|
| 1,154,617 | 9/1915 | Deppe | 165/52 |
| 1,392,168 | 9/1921 | Johnson | 123/545 |
| 1,503,900 | 8/1924 | Johnson | 123/545 |
| 1,610,000 | 12/1926 | Fay | 123/545 |
| 2,133,775 | 10/1938 | Wiesmeier | 123/545 |
| 2,227,462 | 1/1941 | Morris | 123/546 |
| 2,353,787 | 7/1944 | Rostoker | 123/546 |
| 2,833,262 | 5/1958 | August | 123/545 |
| 3,092,088 | 6/1963 | Goossak et al. . | |
| 3,496,919 | 2/1970 | Gerrard . | |
| 3,780,714 | 12/1973 | Dillow . | |
| 3,972,324 | 8/1976 | Marsee | 165/52 |
| 3,996,907 | 12/1976 | Marsee | 165/52 |
| 4,029,065 | 6/1977 | Wood . | |
| 4,036,188 | 7/1977 | Sami et al. . | |
| 4,098,236 | 7/1978 | Okawa . | |
| 4,167,165 | 9/1979 | Finlay | 123/546 |
| 4,208,996 | 6/1980 | Lancaster . | |
| 4,218,999 | 8/1980 | Shearer . | |
| 4,395,997 | 8/1983 | Lee, Sr. . | |
| 4,405,160 | 9/1983 | Tyuuman . | |

FOREIGN PATENT DOCUMENTS

| | | | |
|---|---|---|---|
| 563017 | 11/1934 | Fed. Rep. of Germany | 165/52 |
| 176860 | 3/1922 | United Kingdom | 165/52 |

*Primary Examiner*—Ronald H. Lazarus
*Attorney, Agent, or Firm*—Watts, Hoffmann, Fisher & Heinke Co.

[57] ABSTRACT

A method and apparatus for operating an internal combustion engine that substantially improves the fuel efficiency by utilizing heat normally discharged to the ambient to condition and prepare the fuel mixture prior to entry into the combustion chambers. The apparatus comprises a fuel vaporizer, a fuel mixture heater and a mixture homogenizer located in a fuel mixture flow path intermediate the vaporizer and the heater. The fuel vaporizer includes structure defining an inner heat exchange chamber which receives air and entrained fuel discharged by a fuel introducing device such as a carburetor. The fuel mixture is heated and at least partially vaporized by engine waste heat derived from the engine cooling system or alternately the engine exhaust system. To facilitate the transfer of heat to the fuel mixture, a pair of heat exchange members are disposed in the chamber and include a supply tube defining a flow path for fluid carrying engine waste heat and a plurality of bristle-like heat exchange surfaces radiating outwardly from the supply tube. The bristle-like surfaces are located in heat exchange relation with the fuel mixture in the vaporizing chamber and transfer heat from the heat exchange fluid to the fuel mixture as the fuel mixture passes through the vaporizer.

7 Claims, 4 Drawing Figures

FUEL CONDITIONING APPARATUS AND METHOD

This is a continuation-in-part of application Ser. No. 622,409 filed June 22, 1984, now U.S. Pat. No. 4,503,833 under the title Apparatus and Operating Method for an Internal Combustion Engine which is a continuation of application Ser. No. 312,495 filed Oct. 19, 1981, now abandoned which was a continuation-in-part of application Ser. No. 247,066 filed Mar. 24, 1981, now abandoned. Application Ser. No. 622,409 has now resulted in U.S. Pat. No. 4,503,833 issued Mar. 12, 1985.

TECHNICAL FIELD

The present invention relates generally to internal combustion engines and in particular to method and apparatus for vaporizing and heating a liquid fuel prior to entry into a combustion chamber of an internal combustion engine.

BACKGROUND ART

In many conventional gasoline engines, particularly those used in automotive applications, a carburetor mounted atop an intake manifold forms a principle component of a fuel system. As is well known, combustion air is drawn through the carburetor. A controlled amount of gasoline is added to the incoming air to form a combustible fuel/air mixture, as the air passes through a venturi throat formed in the carburetor. The intake manifold, which includes passages that communicate with valve controlled intake ports in the cylinder head of the engine, conveys and distributes the fuel/air mixture from the carburetor to the combustion chambers.

In theory, the liquid gasoline is vaporized prior to entering the combustion chambers. In a typical IC engine application, however, a portion of the gasoline remains unvaporized and in a liquid state even as it enters the combustion chamber, finally vaporizing during the combustion process. The presence of unvaporized fuel in the combustion chamber reduces the heat of combustion, thus limiting the power output of the engine. In the parent case an apparatus and method for operating an internal combustion engine is disclosed. The illustrated apparatus and described method provides a means for recovering a substantial amount of heat which in more conventional IC engines is exhausted as waste. This recovered heat is used to vaporize the liquid fuel and to superheat the fuel/air mixture. The illustrated apparatus includes a fuel introducing device such as a carburetor, a vaporizer for at least partially vaporizing the liquid fuel discharged by the carburetor and a fuel mixture heater for heating the fuel/air mixture prior to introduction into combustion chambers. An exhaust driven homogenizer is disposed in the fuel mixture flow path intermediate the vaporizer and the fuel mixture heater. The homogenizer is operative to thoroughly mix and homogenize the mixture and also pressurizes and adds additonal heat to it.

As disclosed in the parent case, the fuel vaporizer comprises a housing defining an internal chamber. The walls of the housing includes passages through which engine coolant is passed in order to heat the enclosed chamber. In operation, heat from the coolant is transferred via the chamber walls to the fuel passing through the chamber. The disclosed construction works satisfactorily; however, improvements in the heating efficiency and overall performance are always desired. For example, it is believed that after engine shutdown, as the vaporizer chamber cools, any vaporized fuel in the flow path condenses and collects at the base of the chamber. Upon startup, the collected fuel appears to be immediately ingested by the engine and may cause an overrich running condition for a time which is undesirable.

DISCLOSURE OF THE INVENTION

The present invention provides a new and improved method and apparatus for vaporizing a liquid fuel and heating a fuel mixture prior to introduction into an engine combustion chamber. In addition, the present invention provides a means for collecting and holding fuel condensate after engine shutdown.

According to the invention, a fuel charge forming apparatus is disclosed which includes a high efficiency fuel vaporizer for at least partially vaporizing fuel discharged by a fuel introducing device such as a carburetor. The vaporizer is disposed in a flow path defined between the carburetor and combustion chambers of an IC engine. The flow path communicates with each combustion chamber through an associated valve controlled port.

In addition to the fuel vaporizer, the flow path includes a fuel mixture heater and a fuel mixture homogenizer disposed between the vaporizer and heater. As more fully disclosed in the related earlier applications, the homogenizer thoroughly mixes the fuel/air mixture. The homogenizer contributes significantly to the full vaporization of the fuel. It is believed heavier constituents of the fuel are broken up by being centrifugally flung against hot walls of the homogenizer that are heated to about 300° F. This stops the "fall out" of heavier ends causing them to mix with lighter fuel constituents and resulting in total fuel vaporization. The fuel mixture heater adds significant heat to the fuel/air mixture to "super heat" the fuel/air mixture prior to introduction into the combustion chambers.

In the preferred embodiment, the fuel vaporizer includes a housing defining a chamber through which the fuel mixture passes on its way to the homogenizer. The housing mounts a highly efficient heat exchange member which transfers waste heat from the engine to the incoming fuel mixture. The waste heat can be furnished by the engine exhaust or coolant systems or both. In the exemplary embodiment, the heat exchange member receives heat from the engine coolant system. The heat exchange member comprises a supply tube defining an isolated flow path for engine coolant and a plurality of heat exchange surfaces extending from the tube. The surfaces are defined by a plurality of bristles or spines constructed from a material having good heat transfer properties such as aluminum. Preferably, the bristles extend radially from the heat exchange coolant tube. In the preferred embodiment, the coolant tube is also constructed of a material having good thermal conductivity such as aluminum or copper.

According to the invention, the housing defines an inlet for a heat exchange medium, such as engine coolant and an outlet for discharging the medium after passing through at least a portion of the housing. The inner chamber is defined by side walls and a bottom wall spaced from inner surfaces of wall structure that defines the outer housing. The gap defined between the outer housing and the inner chamber forms a fluid jacket through which the heat exchange medium flows, transferring heat to the inner chamber.

In the preferred and illustrated embodiment, the housing defines a mounting plate to which the fuel introducing device, i.e., the carburetor is mounted. The mounting plate defines an inlet to the chamber through which air and entrained fuel is admitted as it is discharged by the carburetor. The inner chamber also includes an outlet through which the vaporized fuel mixture is discharged which, in the illustrated embodiment, is connected to the fuel mixture homogenizer by a suitable conduit.

In the preferred construction, the chamber inlet and chamber outlet are oriented at substantially 90° to each other. With this, the air and entrained fuel discharged by the carburetor travels downwardly and impinges on the floor of the inner chamber which is heated by the heat exchange medium flowing in the fluid jacket.

According to the invention, at least one but preferably two heat exchange members are located in the vaporizing chamber on either side of the inlet opening and are disposed generally normal to the fuel/air flow path from the inlet to the chamber outlet. The heat exchange members are positioned in regions of the chamber which are outside the area of the chamber outlet so that only a small portion of the periphery of each heat exchange member can be seen when looking directly into the chamber outlet of the vaporizer. With this construction, the heat exchange members do not present any appreciable obstruction in a flow path defined between the chamber inlet and the chamber outlet.

As indicated above, in the preferred construction, the air and entrained fuel to be vaporized enters the chamber inlet and impinges on the heated floor of the chamber. The heat added to the fuel causes the fuel to expand reducing its velocity and increasing its pressure. This causes at least a portion of the fuel mixture to travel towards the heat exchange members and circulate around the members and through the bristle-like heat exchange surfaces before exiting the chamber through the chamber outlet. With the disclosed construction, relatively high heat exchange rates between the heat exchange medium and the fuel mixture can be achieved without significantly impeding the fuel mixture flow.

According to a feature of the invention, the disclosed vaporizer inhibits fuel condensate, accumulated after engine shutdown, from being immediately drawn into the engine upon start-up. It is believed that the bristles or spines of the heat exchange members, because they are small and heated at but one end, cool more quickly than the walls of the chamber and collect droplets of fuel as the fuel condenses during cool down. These bristles also are believed to hold the condensate during initial start-up, whether it be a so-called hot or cold start-up. The condensate is then gradually drawn or metered into the engine over a period of time. As a result, an overrich condition is not generated during engine start-up due to the accumulation of condensate in the chamber after engine shutdown.

Further, in the case of a cold start-up a longer time will elapse before condensate vaporization occurs than is the case with a hot start-up. As the engine warms, choke produced richness is cut off, while in about the same time frame, the spines begin to vaporize condensate and enrich the fuel/air mixture flowing to the homogenizer. The effect is a more linear decrease in cold start fuel/air enrichment from full choke at the initial start-up to the mixture provided at normal engine temperature.

The present invention provides a highly efficient fuel vaporizing apparatus which is both inexpensive and effective. The use of a heat exchange member having a plurality of bristle-like heat exchange surfaces not only increases the heat exchange rate between the engine coolant and the fuel mixture but also acts as an accumulator for fuel condensate when the engine is turned off.

Additional features of the invention will become apparent and a fuller understanding obtained by reading the following detailed description made in connection with the accompanying drawings.

BEST MODE FOR CARRYING OUT THE INVENTION

Figure 1:
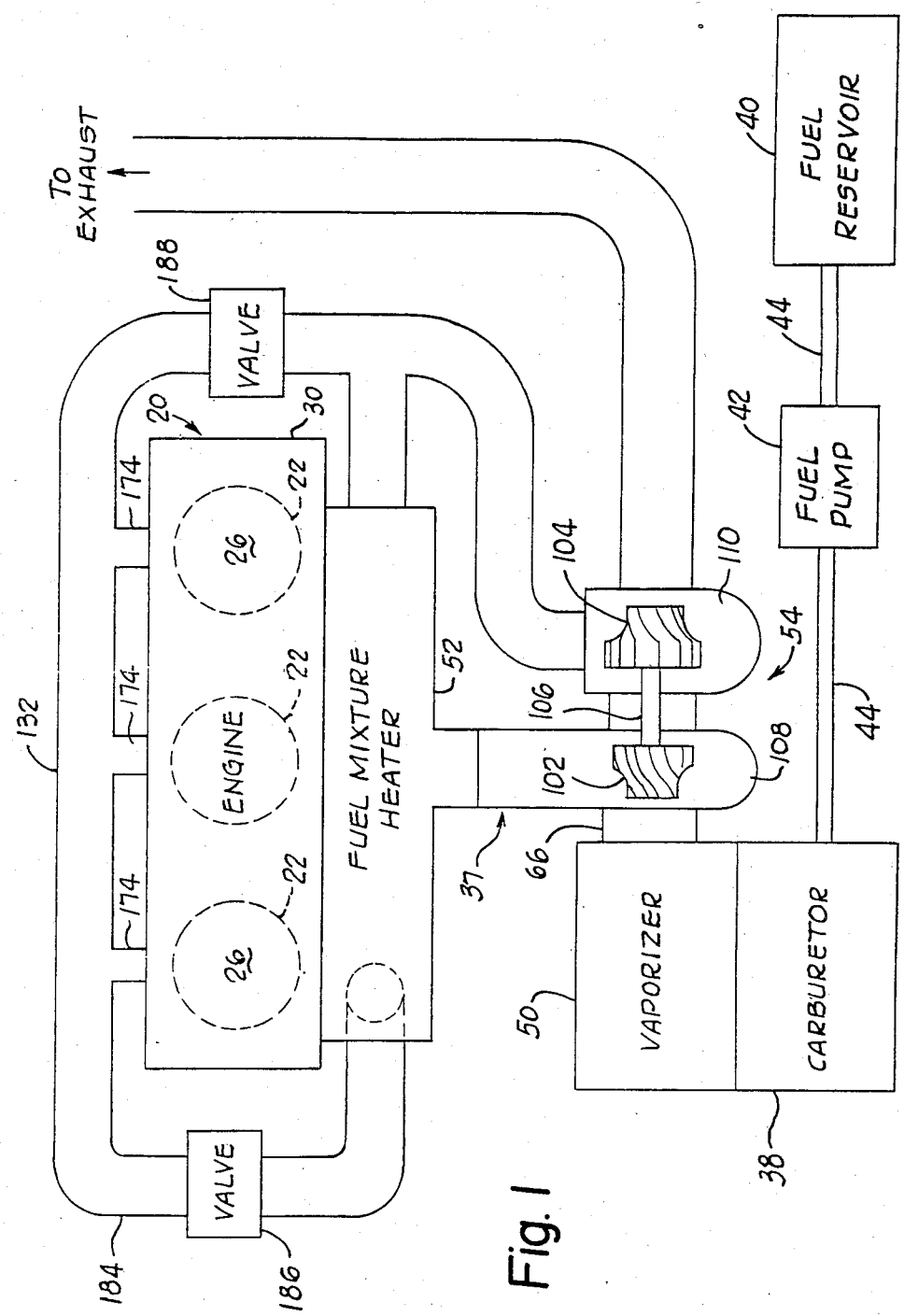
FIG. 1 is a schematic view of a fuel mixture preparing and conditioning apparatus constructed in accordance with the preferred embodiment of the invention.

FIG. 1 schematically illustrates an automobile engine system including a fuel conditioning apparatus for transferring waste heat exhausted by the engine to the incoming fuel mixture. A complete and thorough explanation of the system can be found in related U.S. application No. 622,409, filed June 22, 1984 which is hereby incorporated by reference. By way of summary, the fuel conditioning apparatus is connected to an internal combustion engine 20 which in the illustrated embodiment includes three cylinders 22, formed in an engine block 24, each cylinder 22 including an associated piston 26. The pistons 26 are operatively connected to a crankshaft (not shown) by connecting rods in the conventional manner so that reciprocal movement in the pistons 26 produces rotary motion in the crankshaft.

A cylinder head 30 is suitably fastened to the top of the engine block 24 and defines a combustion chamber (not shown) in each cylinder 22. The inflow of fuel/air mixture into each combustion chamber and the outflow of combustion products is controlled by a suitable valve mechanism such as conventional cam driven poppet valves (not shown).

The fuel mixture flow path extends between the cylinders 22 and a fuel introducing device 38 such as a carburetor. Liquid fuel is delivered to the carburetor 38 from a fuel tank 40 by a conventional fuel pump 42 and associated conduits 44. The carburetor 38 preferably operates in a conventional manner and combines controlled amounts of air and liquid fuel to form a combustible fuel mixture.

In general, only a portion of the liquid fuel will be vaporized in a throat of the carburetor as it enters the air flow stream. A fuel mixture vaporizer 50 and a fuel mixture heating device 52 are disposed in and preferably form part of the fuel mixture flow path and transfer heat to the incoming fuel mixture to insure complete vaporization. Preferably, the fuel mixture is heated to a temperature above the vaporization temperature of the liquid fuel, preferably to a temperature which is twice the vaporization temperature of the fuel. A fuel mixture homogenizer, indicated generally by the reference character 54, is disposed in the flow path intermediate the vaporizer 50 and the heating device 52.

In the illustrated embodiment, both the fuel mixture heater 52 and the homogenizer 54 receive heat from the engine exhaust gases and transfer this otherwise waste heat to the fuel mixture. The path of exhaust gas flow to the fuel/air mixture heater 52 and the homogenizer 54 is shown schematically in FIG. 1. An exhaust conduit 132 extends into fluid communication with a plurality of exhaust ports (not shown) formed in the cylinder head 30 through three branch conduits 174. The conduit 132 forms an exhaust manifold connected, at its left end, to a transfer conduit 184 which includes a valve 186. The transfer conduit 184 communicates exhaust gas from the intake manifold 132 to the fuel mixture heater 52. The right end (as viewed in FIG. 1) exends into fluid communication with a turbine housing 110 of the homogenizer 54 as well as the fuel mixtue heater 52. A valve 188 controls the exhaust flow from the right end of the conduit 132.

The valves 186, 188 are used to adjust the exhaust flow in the respective conduits. The valve 186 controls the amount of exhaust gases communicated to the fuel mixture heater 52. By properly adjusting the respective valves, a heat balance is obtained wherein the exhaust gas conveyed to the heater 52 will deliver the requisite amount of heat to the fuel mixture, the heat delivered being a function of the power output of the engine. The exhaust gas communicated to the turbine housing 110 causes rotation of the exhaust turbine 104. The turbine 104 is connected to a homogenizer turbine 102 by a common shaft 106 such that rotation of the exhaust turbine 104 produces concurrent rotation in the homogenizer turbine 102 located in an associated turbine housing 108. The rotation of the turbine 102 mixes and homogenizes the fuel mixture traveling to the engine prior to introduction into the combustion chambers.

The three components, namely the vaporizer 50, the homogenizer 54 and the fuel mixture heater 52 all contribute to the complete vaporization and heating of the fuel mixture prior to entering the combustion chambers. The three stage fuel mixture preparation provided by the disclosed apparatus insures virtually complete fuel vaporization. It has been found that heat alone will not fully vaporize a liquid fuel. Simple heating will simply vaporize the volatile fuel components leaving behind an unvaporized residue. The present invention achieves virtually complete vaporization by not relying solely on heat. Instead, the apparatus both heats and homogenizes the mixture to disperse or break up the heavier components, preventing the "fallout" of these heavier components. In particular, the centrifugal force imparted to the fuel mixture by the homogenizer turbine 108, causes the heavier constituents to be flung against the hot walls of the homogenizer housing thus breaking these heavier constituents into even smaller particles.

As discussed, the vaporizer 50, the homogenizer 54 and the super heater 52 each contribute to the heating of the fuel mixture. It has been found that for commercially available and commonly used gasoline, the disclosed apparatus raises the fuel mixture temperature to approximately 300°-450° F. prior to introduction into the combustion chambers. The contribution of each of these devices is as follows. The vaporizer 50 raises the fuel mixture temperature to approximately 150°-200° F. The homogenizer raises the temperature to approximately 200°-300° F. and the fuel mixture heater 52 raises the final temperature of the fuel mixture to approximately 300°-450° F.

It must be noted that the above temperature ranges are those obtained when using currently available gasoline. When using other fuels having different vaporization temperatures, the heat ranges will be adjusted proportionately. In the case of diesel fuel, which has a much higher vaporization temperature than gasoline, significantly higher temperature ranges would be reached. In the disclosed apparatus the source of heat for the vaporizer 50 is the engine coolant which limits the availabe source temperature to around 200° F. When a higher temperature is needed for the vaporizer, exhaust gases would be used as a source of heat so that the fuel mixture could be heated to substantially more than 200° F. by the vaporizer. In summary, the heating achieved by the vaporizer 50, homogenizer 54 and mixture heater 52 are determined by the application and the available energy. The ranges are adjusted as needed and are determined, in part, by the fuel being used.

The present invention discloses a vaporizer construction for enhancing the vaporization of the fuel discharged by the carburetor 38. The construction of the vaporizer is illustrated in FIGS. 2-5. The vaporizer 50 includes an outer housing 60 defining an inlet opening 62 for receiving the fuel mixture to be vaporized from the carburetor 38 and an outlet 64 through which the vaporized fuel mixture exits. As seen in FIG. 1, the fuel mixture leaves the vaporizer 50 and is conveyed to the homogenizer 54 by a suitable passage or conduit 66. The housing 60 also defines inlet and outlet fittings 70, 72 for receiving and discharging a heat exchange medium. In the illustrated embodiment, the heat exchange medium comprises engine coolant which, in more conventional automobile engine systems, receives heat from the engine block and engine head and discharges it to atmosphere by way of a radiator (not shown). With the present invention, the heat absorbed by the coolant is conveyed to the vaporizer and is transferred to the fuel mixture.

The outer housing includes integral mounting pads 74 by which the vaporizer is mounted in a vehicle. In the illustrated construction, a carburetor mounting plate 76 is defined by the housing and surrounds the inlet 62. The plate includes a plurality of threaded bores 78 which are adapted to receive mounting bolts for clamping the base of the carburetor to the mounting plate. As is known in the art, a gasket or other seal arrangement is normally used between the carburetor and mounting plate to seal the area from atmosphere.

The vaporizer 50 includes an inner chamber 80 defined by side walls 82, 84 and a bottom plate 86. As seen best in FIG. 2, a coolant jacket is defined between the inner chamber 80 and external housing 60. In particular, coolant receiving gaps are defined between the inner walls 82, 84 and a wall 60a of the external housing as well as between the bottom wall 86 of the inner chamber and a bottom wall 60b of the external housing. The gaps form a fluid jacket 88 surrounding the inner chamber 80. In normal operation, engine coolant communicated to this jacket via the inlet 70 heats the inner chamber by conduction through the side walls 82, 84 and the bottom wall 86.

Figure 2:
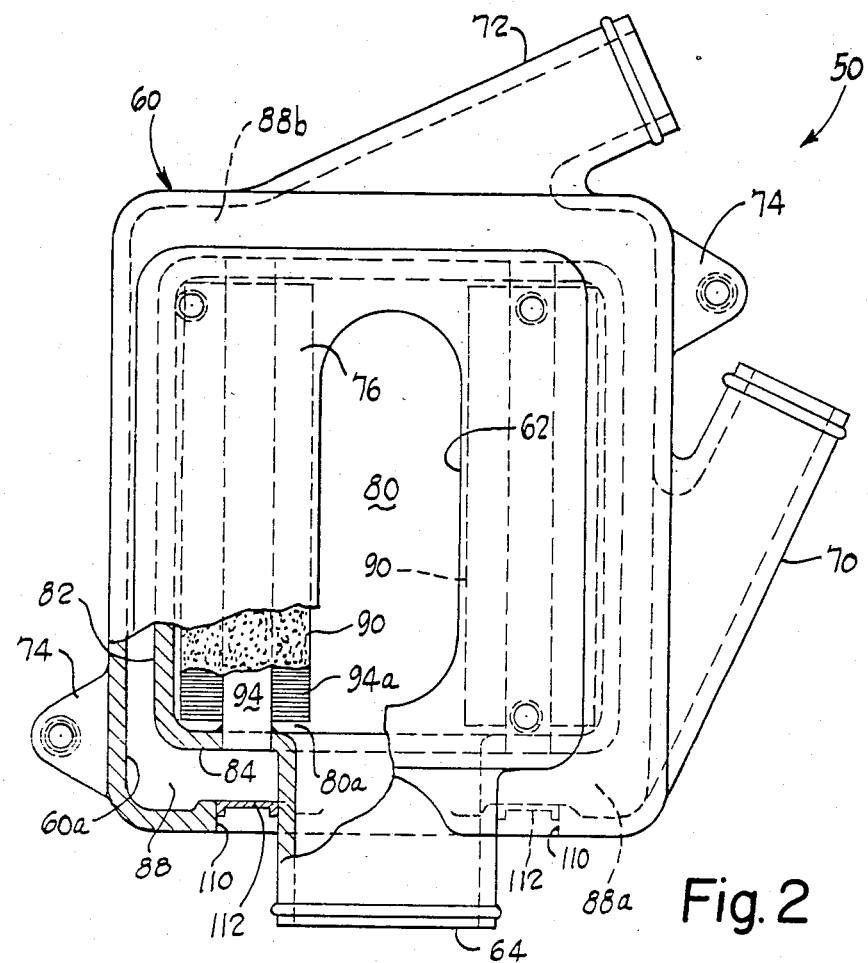
FIG. 2 is a plan view with portions broken away to show interior detail of a fuel vaporizer constructed in accordance with a preferred embodiment of the invention.

In accordance with the invention, a heat exchange member having bristle or spine-like fins is disposed within the inner chamber 80. During operation, the heat exchange member is in a heat exchange relationship with the fuel mixture communicated to the inner chamber 80. As seen best in FIGS. 2 and 4, in the preferred construction, two heat exchange members 90 are disposed in the inner chamber and are oriented such that they are parallel to an axis 92 of the vaporizer outlet 64. Each heat exchange member comprises a supply tube 94 (shown best in FIG. 2) which is surrounded by a plurality of heat exchange spine-like fins 94a. The heat exchanger surfaces defined by the fins 94a radiate radially from the supply tube 94. As seen in FIG. 2, the supply tubes 94 are in fluid communication with the the coolant jacket 88 that surrounds the inner chamber 80. It should be noted that a lower jacket portion 88a (as viewed in FIG. 1) communicates with the inlet 70. An upper jacket portion 88b (as viewed in FIG. 1) communicates with the outlet 72. The heat supply tubes 94 of the heat exchange members span the inner chamber 80 with one end of the supply tubes communicating with the lower portion 88a of the jacket 88 and an upper end of the tubes communicating with the upper jacket portion 88b. Consequently, at least a portion of the coolant communicated to the vaporizer travels from the inlet 70 through the supply tubes 94 and then is discharged by the outlet 72.

Figure 3:
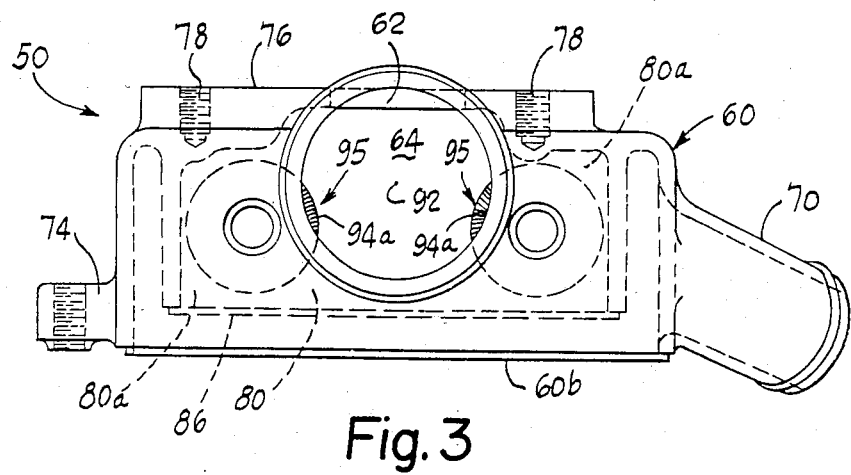
FIG. 3 is an end view of the vaporizer shown in FIG. 2.
Figure 4:
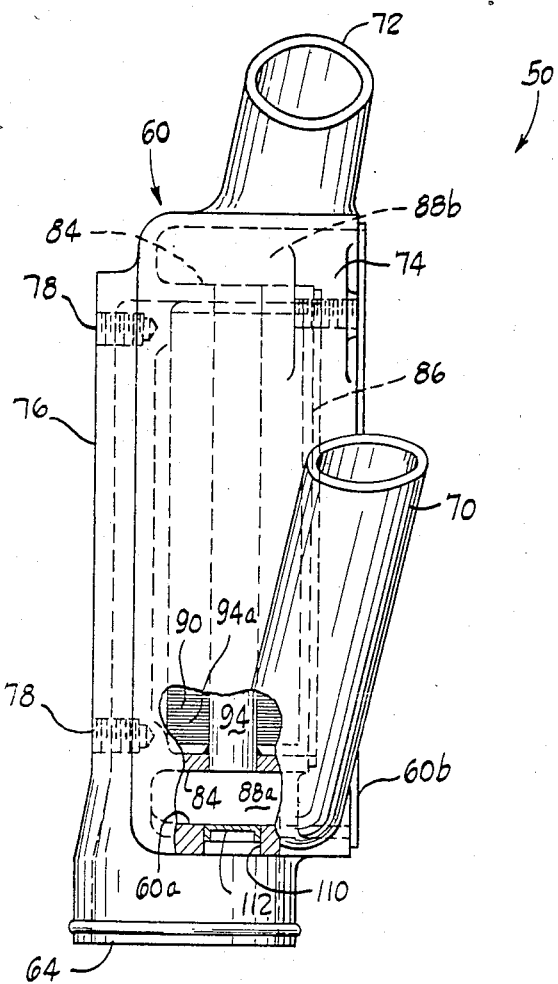
FIG. 4 is a side view of the vaporizer with portions broken away to show interior detail.

As seen in FIG. 2, the heat exchange members are disposed outside the periphery of the inlet 62 and as seen in FIG. 3, only a small peripheral portion 95 of the spine-like fins 94a can be seen from the vaporizer outlet 64. With this construction, the members 90 do not present a substantial obstruction to the fuel mixture flow which would reduce the efficiency of the fuel induction system.

In the preferred and illustrated embodiment, the members 90 are located in regions 80a of the chamber 80. The regions 80a are located to the sides of a region of the inner chamber 80 that defines a 90° flow path between the inlet 62 and the outlet 64.

During normal operation, it is believed that the vaporizer operates as follows. Partially vaporized fuel and air are discharged by the carburetor 38 into the vaporizer 50 via the inlet 62. The fuel mixture travels downwardly (as viewed in FIG. 3) and strikes the heated bottom wall 86 of the inner chamber 80. The heat transferred to the fuel mixture causes the fuel to vaporize and expand thus decreasing its overall velocity and increasing its pressure. This causes at least a portion of the fuel mixture to travel around the heat exchange members 90 prior to leaving the vaporizer by way of the outlet 64. As the fuel mixture travels around the heat exchange members, additional heat is transferred to the fuel mixture from the supply tubes 94 and spine-like fins 94a causing further vaporization and heating of the fuel.

The spine-like fins 94a that radiate from the supply tubes 94 present highly efficient heat exchange surfaces without causing undue obstruction to the flow. It is believed that relatively high heat exchange rates are achievable with this constructions as compared to more conventional fin constructions which usually comprise large, continuous heat exchange surfaces. With these prior constructions, obstructions to fuel mixture flow were encountered and therefore the heat exchange between the heat exchange medium and the fuel mixture was less efficient.

It should be noted that, in order for the fuel conditioning system shown in FIG. 1 to operate properly, the fuel must be sufficiently vaporized by the fuel vaporizer 50 prior to introduction into the homogenizer. If excessive, raw unvaporized fuel is allowed to enter the homogenizer and fuel mixture heater, the efficiency of the engine will be reduced because the fuel mixture will not be sufficiently heated when it enters the combustion chamber. As fully described in the above identified related U.S. application, if the fuel is not properly heated, performance in the engine will be degraded.

Additionally, the vaporizer reduces or minimizes the need for a radiator for transferring engine waste heat from the engine coolant to atmosphere. Ideally, the radiator can be eliminated if all of the waste heat is transferred entirely to the incoming fuel mixture. It is therefore imperative that the fuel vaporizer 50 be as efficient as possible in order to achieve a heat exchange rate at which substantial portions of the engine waste heat are transferred from the engine coolant to the fuel mixture. The construction of the vaporizer disclosed by the present invention minimizes the need for a radiator and cooling fan.

The illustrated heat exchange members can be formed from a commercially available product. Sources for this product include the Trane Company of Tyler, Tex., and Carrier Corporation of Syracuse, N.Y. It has been found that, for the vaporizer 50 illustrated in FIGS. 1-4, a heat exchange tube 94 measuring approximately 4¾" in length provided satisfactory results. The inner diameter of the supply tube 94 for this experimental vaporizer was approximately 0.44" and the overall diameter including the spine-like fins or bristles was approximately 1.38".

The use of the disclosed heat exchange members 90 having the bristle-like heat exchange fins 94 provides an added feature of the invention. When the engine 20 is shut down, the fuel in the vaporizer 50 eventually condenses as the vaporizer cools. Absent the heat exchange members, this liquid fuel is drawn into the engine immediately upon start-up. It was found that this inrush of raw fuel produced an overrich condition in the engine at start-up.

With the use of the heat exchange members 90, this overrich condition is at least partially alleviated. In operation, when the engine is shut down the fuel condenses on the bristles. It has been found that the droplets of fuel condensate are held by the bristles and are prevented from immediately being drawn into the engine upon start-up. In fact, it is believed that the bristles in effect meter the inflow of fuel concentrate after start-up so that the overrich condition described above is reduced or eliminated.

Although various construction methods can be used to assemble the vaporizer 50, in the illustrated construction, apertures for the heat exchange tubes 94 are drilled into the inner sidewalls 84. In order to obtain access to the inner wall, clearance openings 110 are drilled through the external housing 60. In order to assemble the vaporizer, the heat exchange members are inserted in their proper locations inside the inner chamber prior to securing the inner chamber bottom wall 86 and the bottom plate 60b of the housing 60. The supply tubes 94 are secured to the inner walls 84 by welding or other suitable process such as adhesive bonding. After the tubes are secured inside the inner chamber 80, the access holes 110 drilled in the outer housing 60 are sealed by plugs 112. The bottom plates 86, 60b are then secured to the bottom of the inner chamber 80 and outer housing 60, respectively. It should be apparent that other methods can be employed to form the disclosed vaporizer. The entire housing may be cast or stamped from various materials and in fact, the inner chamber walls and outer housing may be formed by diverse materials. Since it is desired to have maximum heat flow into the inner chamber 80, in the preferred embodiment, the inner chamber walls are constructed of a heat conductive material, such as aluminum. The outer housing may be constructed of a heat insulating material to minimize heat loss from the coolant to ambient.

Although the invention has been described with a certain degree of particularity, it should be understood that those skilled in the art can make various changes to it without departing from the spirit or scope of the invention as hereinafter claimed.

I claim:

1. A fuel vaporizing apparatus for a spark ignition, internal combustion engine, comprising:
   (a) outer structure defining an outer housing including a carburetor mounting plate, outer side walls and an outer bottom wall, enclosing said side walls, said structure further defining a housing inlet for receiving engine coolant and a housing outlet for discharging said coolant after passing through at least a portion of said housing;
   (b) inner structure defining an inner vaporization chamber including inner side walls, spaced a predetermined distance from said outer side walls and an inner bottom wall spaced a predetermined distance from the outer bottom wall such that a fluid jacket is defined between an inner surface of said outer housing and an outer surface of said inner chamber, said fluid jacket arranged in fluid communication with said inlet and said outlet;
   (c) said carburetor mounting a plate defining an inlet opening spaced above and located in confronting relation with said inner bottom wall, said inlet opening communicating with said chamber for receiving air and entrained fuel discharged by a carburetor;
   (d) said chamber extending into fluid communication with a chamber outlet for discharging a fuel mixture from said chamber, said chamber outlet having an axis that is substantially orthogonal to an axis defined by said inlet opening;
   (e) heat exchange members disposed in said chamber in fluid communication with said fluid jacket, each heat exchange member including a supply tube through which said coolant is conveyed and a plurality of spine-like heat exchanger surfaces extending radially from said supply tube, and located in heat exchange relationship with the fuel mixture in said chamber;
   (f) said heat exchange members being disposed on either side of said inlet opening and in a region of said chamber that is outside a direct flow path defined between said fuel mixture inlet and said fuel mixture outlet whereby said fuel mixture entering said chamber through said inlet is initially heated by impinging on said heated inner bottom wall causing said fuel mixture to expand, reducing its velocity and increasing its pressure such that at least a portion of said fuel mixture travels towards the heat exchange members and circulates around said members before exiting said chamber through said chamber outlet.

2. The apparatus of claim 1 wherein said heat exchange member is mounted in said chamber parallel to an axis of said chamber outlet.

3. The apparatus of claim 1 further comprising an additional heat exchange member including a supply tube and a plurality of radially directed spine-like heat exchange surfaces.

4. The apparatus of claim 3 wherein said heat exchange members are disposed in said chamber on either side of said inlet opening.

5. The apparatus of claim 1 wherein said inlet opening and said chamber outlet are oriented such that an axis of said inlet is orthogonal to a central axis of said outlet.

6. A fuel mixture vaporizer for an internal combustion engine, comprising:
   (a) a structure defining a housing having a housing inlet for receiving a heat exchange medium and a housing outlet for discharging said medium after passing through at least a portion of said housing;
   (b) said structure further defining an inner chamber located within said housing having a fuel mixture inlet for receiving a fuel mixture discharged by a fuel introducing device and a fuel mixture outlet for discharging said fuel mixture from said inner chamber;
   (c) a heat exchanger member disposed in said inner chamber including a supply tube through which heat exchange medium is conveyed, and a plurality of bristle-like heat exchange surfaces radiating outwardly from said supply tube in heat exchange relationship with said supply tube and the fuel mixture in said chamber;
   (d) said heat exchange member being disposed in a region of said chamber that is outside a direct flow path defined between said fuel mixture inlet and said fuel mixture outlet whereby said fuel mixture entering said chamber through said inlet is initially heated by impinging on heated portions of said chamber causing said fuel mixture to expand, reducing its velocity and increasing its pressure such that at least a portion of said fuel mixture travels towards the heat exchange member and circulates around said member before exiting said chamber through said chamber outlet.

7. The apparatus of claim 6 wherein said inner chamber includes two regions outside of the direct flow path, with a heat exchange member located in each region.

* * * * *